United States Patent [19]

Klein

[11] Patent Number: 4,987,697
[45] Date of Patent: Jan. 29, 1991

[54] HOOK CONNECTOR

[76] Inventor: Gerald B. Klein, 13451 Stuart Ct., Broomfield, Colo. 80020

[21] Appl. No.: 429,044

[22] Filed: Oct. 30, 1989

[51] Int. Cl.⁵ ............................................. A01K 91/04
[52] U.S. Cl. .................................................... 43/44.83
[58] Field of Search .................... 43/44.83, 42.49, 44.8, 43/42.36, 42.37

[56] References Cited

U.S. PATENT DOCUMENTS

| | | | |
|---|---|---|---|
| 319,655 | 6/1885 | Wright | 43/44.83 |
| 2,255,793 | 9/1941 | Kridler | 43/44.83 |
| 2,847,220 | 8/1958 | Heffron | 43/44.83 |
| 2,995,858 | 8/1961 | Rathman | 43/44.83 |
| 3,148,423 | 9/1964 | Anspach | 43/44.83 |
| 3,878,637 | 4/1975 | Flower | 43/44.83 |
| 3,898,760 | 8/1975 | Klein | 43/44.83 |
| 3,983,657 | 10/1976 | Klein | 43/44.83 |
| 3,988,852 | 11/1976 | Klein | 43/44.83 |
| 4,092,796 | 6/1978 | Adams | 43/44.83 |

FOREIGN PATENT DOCUMENTS

| | | | |
|---|---|---|---|
| 726188 | 5/1932 | France | 43/44.83 |
| 1109368 | 9/1955 | France | 43/44.83 |
| 7397 | of 1888 | United Kingdom | 43/44.83 |

Primary Examiner—Kurt Rowan
Attorney, Agent, or Firm—Dennis O. Kraft

[57] ABSTRACT

An improved line connector, of synthetic resin such as nylon, for a fishhook. The connector is a rod-like member having one end affixed to the shank of a fishhook. The improvement resides in the construction of the axial passageway and the knot pocket at the other end of the connector to hold the knotted end of a fishline. The improvement is to enhance the reliability and holding strength of both the connector and the line by providing a greater resilience of the connector to reduce the possibility of shock failure of either the connector or the knotted end of the line. A deep cone-shaped entrance of the passageway, at the end of the connector combined with a slotted side opening, forming a knot pocket, facilitates flexing of the seat within the pocket against which the knot is held and flexing of the sides of the connector against which the knot is pressed. This is especially important in avoiding undesirable stress concentration. A raised boss is extended about the slotted opening to functioin as a flexible buffer against cuts and dents as a tightly fitting knot is pulled into the slot pocket.

6 Claims, 2 Drawing Sheets

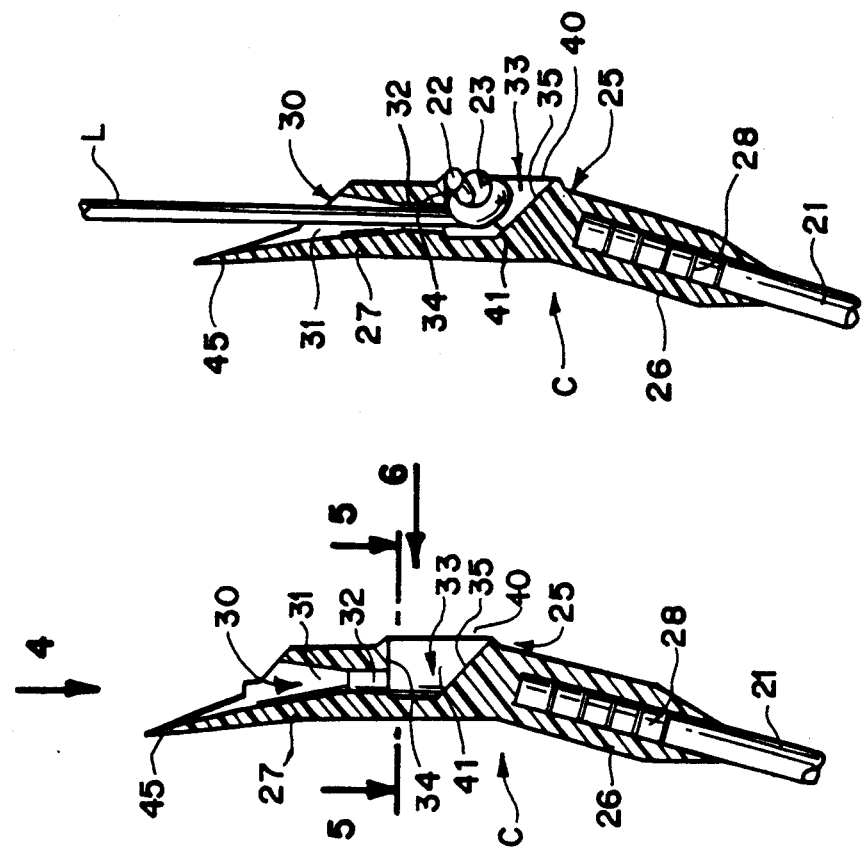
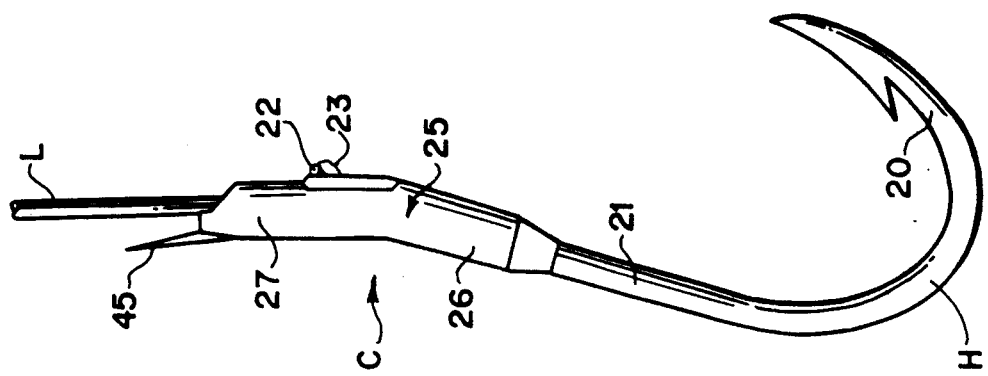
FIG. 3
FIG. 2
FIG. 1

HOOK CONNECTOR

BACKGROUND OF THE INVENTION

This invention relates to hook connectors mounted on the shanks of fishhooks for the attachment of lines, leaders or snells. As such, the invention will be hereinafter called a 'hook connector' or a 'connector' and the attached line, leader or snell will be called a 'line'.

The present invention is a development from and an improvement over the hook connectors disclosed in my prior patents, U.S. Pat. Nos. 3,717,907; 3,898,760; 3,988,852 and 4,165,578. The improved hook connector and the prior art hook connectors of the reference patents are generally formed as elongated rod-like members of a hard but resilient synthetic resin material such as nylon. The shank of a hook is embedded and tightly affixed in a socket at one end of a connector. An axial passageway through the other end of the connector member has a pocket-shaped side exit near the center of the member. A line is threaded through this passageway with its end projecting from the side exit. This projecting end is knotted and the line is pulled from the connector to pull the end knot into the pocketed side exit. With the knot tightly fitting in the socket, the line is secured to the hook.

When market tests of the prior art hook connectors were under way it was discovered that the connectors would occasionally break apart at the pocketed side exit. It was also found that the line would break at the knot at a pull substantially less than the tensile strength of the line. The prior art connectors were made of the best high strength nylon or celcon materials available and in tensile tests the connectors were found to have considerable strength, even more than that of a line connected to them. The reasons for hook connector breakage, at comparatively low tension when in use were not clear. Flaws which would come about in manufacture of the connectors would be apparent in tensile tests. Other factors, the effects of aging, of sunlight and of repeated immersion in water were found to be insignificant.

It was discovered, however, that repeated connections and disconnections of a hook to a line caused some of these failures. Whenever a hook was repeatedly attached to and disconnected from the line, and the knotted end of the line was pulled into and from the pocketed side exit of the connector, the pressure of the knot could create stress concentrations and zones of weakness leading to the eventual rupture of the connector. It was also found that more often failure occurred when the knot cut itself or slipped out of itself.

An apparent solution to the connector breakage problem would be to beef up the connector by increasing its diameter. However, such was found to render the fishhook bulky and resistant to threading bait onto the hook. Also, the connector would be so rigid that the knot would not easily lock into position and be gripped by a flexing of the connector about the pocket, nor would this beefing-up of the connector solve the problem of nicks and dents in the connector which would lead to breakage.

SUMMARY AND OBJECTS OF THE INVENTION

The present invention was conceived and developed to provide a hook connector which will better resist the breaking problem above mentioned. The invention comprises, in essence, a hook connector including an axial passageway with a deep cone-shaped entrance, through which a line is threaded to a longitudinally slotted side opening in the connector to be reinforced by a raised boss at its exit. The deep cone-shaped entrance reduces the overall mass of the connector while the slotted side opening is sized to receive and tightly grip the knotted end of a line but at the same time to more easily flex when accommodating the line knot. Such flexing as when the knotted end of a line is pulled into place or a heavy fish is on the line, while stressing the connector in an overall manner avoids undesirable stress concentrations. The raised boss at the exit of the slotted side opening is especially effective in supplementing flexing and preventing stress concentrations and crack-forming indentations which can occur when a line knot is pulled into the slot of a rigid connector. Finally all edges and corners are rounded or chamfered to further avoid stress cracks that originate at sharp edges and corners.

The objects of the present invention are thus, to provide a novel and improved connector for a fishhook which: will not fail when it is repeatedly connected and disconnected to a knotted line; has a strength closely approaching the tensile strength of the line, regardless of the size of line used; may be quickly and easily attached to and removed from a line even in the dark; eliminates the tedious and unreliable hand tying operations that are used to attach a conventional hook to a line, and is an inexpensive, simple, compact, neat-appearing unit that facilitates the placement of a bait on the hook.

BRIEF DESCRIPTION OF THE DRAWINGS

With the foregoing and other objects in view, my invention comprises certain constructions, combinations and arrangements of parts and elements as hereinafter described, defined in the appended claims and illustrated in preferred embodiment in the accompanying drawings, in which:

FIG. 1 is a side elevational view of a fishhook with the improved connector and with the end of a line secured to the connector.

FIG. 2 is a longitudinal sectional view of a portion of the hook shank and the connector affixed thereto.

FIG. 3 is a longitudinal sectional view similar to FIG. 2 but with a line inserted and affixed in the connector.

DETAILED DESCRIPTION OF THE PREFERRED EMBODIMENT OF THE CONNECTOR

Figure 7:
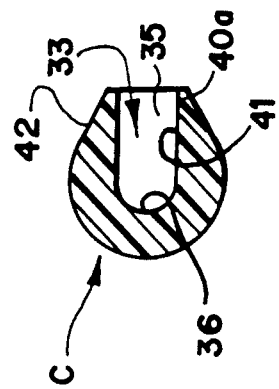
FIG. 7 is a sectional view similar to FIG. 5 but showing a modified construction thereof.

Referring more particularly to the drawings, FIG. 1 exemplifies a hook H connected to a line L by an improved connector C. The hook H is formed with a conventional curved, barbed point 20 carried on a shank 21. The line L is commonly a strand of nylon with its end 22 being threaded into a passageway in the connector C, extended from a side opening thereof and knotted as at 23 with the knot being pulled into a pocket formed in the connector C at the side opening. As heretofore mentioned, a snell or leader of nylon or similar material may be used in place of the line L.

The connector C is formed as a small, elongate body 25. It is essentially cylindrical in section and consists of two portions, a hook-holding portion 26 and a line-holding portion 27. These portions may be in alignment to form a straight body but preferably they are angled with respect to each other, as illustrated, to orient the point of the hook to be in the direction of the pull of the line L. This connector C is formed of nylon or a similar strong, resilient material. Celcon is another resin suitable for the purpose and it will accept a fluorescent coloring material which is desired by some fishermen. This connector will be manufactured by injection molding processes as an efficient, low-cost operation well known to the prior art.

The body 25 of the connector has a diameter which need not be much greater than the diameter of the hook shank 21 and a preferred diameter is no more than about twice the hook shank diameter since a significant advantage of this arrangement of the hook H, the connector C and the line L is the ease with which bait may be threaded onto the hook. The body 25 of the connector is preferably formed and molded with the hook holding portion 26 being upon the hook shank 21 for a tight, permanent fit. Serrations 28 or the like may be provided upon the hook shank 21 for a tighter and more secure fit.

The line holding portion 27 of the connector includes an axial, longitudinal passageway 30 through which the line L is threaded. An entrance section 31 of this passageway, at the end of the portion 27, is a deep funnel and it is shaped to better guide the end 22 of the line L into the passageway and also, to reduce the mass of the connector to provide an increase in resilience and thereby reduce stress concentrations caused by the knotted line especially those caused by a sudden pull of the line as when a fish strikes. A short intermediate passageway section 32 is of constant diameter and is sized to receive the line L used with the connector. A third passageway section is the slotted side opening 33 hereinbefore referred to and will now be described in detail.

The side opening 33 is axially elongated, to form a slot, and permit lateral deflection of the sides of the connector C whenever a knot 23 is pulled into the opening. Such lateral deflection of the hard but resilient nylon, or like material, permits the knot to be tightly held in the side opening without over stressing the material. To accommodate the knot 23, this slot 33 forms a pocket having a width greater than the diameter of the adjacent passageway 32 and the depth of the slot extends beyond the inner edge of the passageway 32 to form a shoulder 34 about the exit of the passageway 32. The knot 23 must be larger than the passageway 32, tightly fit into the slot 33 and seated against the shoulder 34 when it is pulled into the slot.

A tight, proper fit of a knot 23 into the pocket formed by the slotted side opening 33 will require the knot 23 to be tied in various ways depending upon the diameter of the line L with respect to the diameter of the short passageway 32. A line selection may vary from a line which will just pass through the passageway 32 to a line much smaller than the passageway 32. In fresh water fishing, for example, a 10-pound test line and a much smaller 1 pound test line may be used interchangeably.

A simple overhand knot, as illustrated, may be sufficient for the larger line but a figure-8 knot, a stevedors knot or more complex knots may be required for small lines or leaders. This requires a moderate degree of skill on the part of a fisherman to tie a suitable knot, but such is a skill that is easily acquired.

The bottom 35 of the slotted opening, opposite the intermediate passageway 32 is sloped to direct the end of a line L out of the slotted opening 33 when the line is pushed through the passageway 30. The backwall 36 of the slotted side opening 33, also the bottom 35 and the top shoulder 34 are fully rounded to further avoid stress concentrations whenever a line knot is pulled into the slot. Moreover, the construction of the connector in general and especially the slotted slide opening 33 is with all corners and edges being rounded and with the inside corners being filleted to prevent any start of a stress crack or tear.

To better permit a knot 23 to be pulled into the pocket formed by the side opening slot 33, the side opening is surrounded by a boss 40, fully rounded and filleted. This boss will deepen the pocket, reinforce, protect and permit the body of the connector at each side of the slot to be thinner and more resilient. Moreover, the boss can more easily flex than can the body of the connector at the sides of the slot whenever a knot is pulled into the slot. At the same time the boss can help initiate flexing of the connector without over stressing it. This tends to prevent any nick or dent to form in the wall of the pocket 33 as might otherwise be caused by the pressure of a knot being pulled thereinto.

Figure 6:
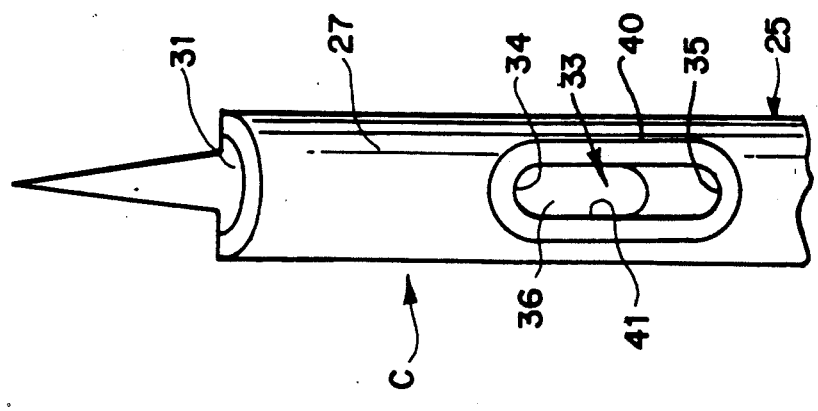
FIG. 6 is an elevational view of a portion of the connector as taken from the indicated arrow 6 at FIG. 2 but on an enlarged scale.
Figure 4:
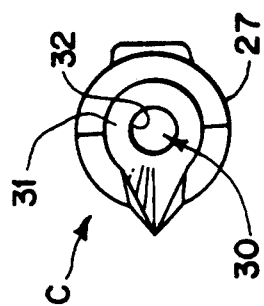
FIG. 4 is an end view of the unit as taken from the indicated arrow 4 at FIG. 2 but on an enlarged scale.
Figure 5:
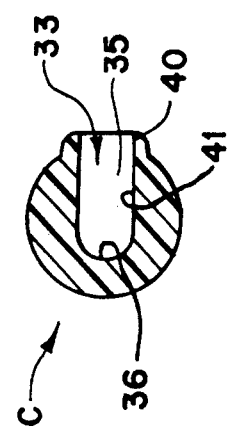
FIG. 5 is a transverse sectional view as taken from the indicated line 5—5 at FIG. 2 but on an enlarged scale.

The dimensions and proportions of the entrance section 31, the passageway 32 and the pocket formed by the longitudinally disposed, slotted side opening 33 may be varied somewhat depending upon the connector diameter and the line size which the longitudinal passageway 30 can accommodate. The width and depth of the slotted opening 33 must be such as to provide a suitable shoulder 34 about the exit of the intermediate passageway 32 into the slot. This width should be approximately one-third the diameter of the connector C to provide suitable wall portions 41, FIGS. 5 and 6, which in conjunction with the boss 40 will flex outwardly to increase the width of the slot pocket when a knot is pulled into it. The length of the slot will control the degree of flexing and it was found that a preferred length was about 5-times the slot width, as best illustrated at FIG. 6. However, this length may be varied depending upon the material used for the connector and other factors and may be from 3 to 8 times the slot width.

It is to be noted that the flexing of the body of the connector at each side of the slot 33 will effectively grip and hold the knot to prevent it from slipping and untying. To further secure the knot, the deep funnel entrance section 31 and short intermediate passageway 32 are so proportioned as to provide a further resilience to the body, at the shoulder 34, where the knot seats when the line is under tension. This resilience at the shoulder 34 permits a firmer seating action which tends to protect the knot from rupture. Thus, even though the mass of the connector is reduced, the reliability of the connector itself and of the knot attaching the line to the connector is materially augmented and to the extent that the connector is now commercially acceptable.

FIG. 7 illustrates a minor variation of the boss 40a wherein the outward wall surface 42 of the boss is faired to lie tangentially with the connector, eliminating the outer fillet between the boss and the wall of the connector.

Other modifications and additions may be associated with this hook connector C. Fox example, a spur 45 may be provided at the end of the connector as illustrated. This need not be further described since the same is fully disclosed in my U.S. Pat. No. 4,165,578.

I have now described my invention in considerable detail. However, it is apparent that others skilled in the art can devise and build alternate and equivalent constructions which are within the spirit and scope of my invention. Hence, I desire that my protection be limited, not by the constructions illustrated and described but only the proper scope of the appended claims.

I claim:

1. In a rod-like connector having one end affixed to the shank of a fishhook, a passageway through the other end sized to receive an end of a fishline threaded thereinto and a side opening in the connector connecting with the passageway through which the end portion of the line will project when threaded into the passageway, with the side opening forming a pocket proportioned to receive and hold a knot tied in the projected end portion of the fishline which is too large to be pulled through the passageway, the improvement wherein: said passageway entrance receiving the end of a fishline includes a section which is enlarged in diameter, with the section being of a funnel form to extend into the connector and to connect with a smaller short cylindrical passageway section which terminates at the aforesaid pocket.

2. The connector defined in claim 1, wherein the depth of the enlarged funnel form section and the length of the cylindrical passageway section are proportioned to permit a reduction of mass in the connector and enhance the resilience of the connector at the shoulder portion of the pocket adjacent to the exit of the cylindrical passageway section.

3. An elongate line connector having one end affixed to the shank of a fishhook to attach a fishline thereto, a passageway having a funneled entrance in the other end of the connector sized to receive the fishline, through which a fishline may be threaded, and a pocket-like, longitudinally-slotted sidewall exit from which the end portion of a fishline may extend and be knotted, with the width of the slotted exit being such that the line knot will fit thereinto with a tight fit and the size of the passageway being such that the knot cannot pass therethrough, and with the slot being such that the sidewall portions of the slot may spread without being over stressed, and a raised boss formed abut the slotted side opening to intercept a knot being pulled into the pocket to engage the sides of the knot to initiate flexing of the side portions of the connector responsive to pressure of the knot and to absorb and yield to stress concentrations caused by the knot which would otherwise tend to dent or tear the connector.

4. In a rod-like connector having one end affixed to the shank of a fishhook, a passageway through the other end sized to receive an end of a fishline threaded thereinto and a side opening in the connector connecting with the passageway through which the end portion of the line will project when threaded into the passageway, with the side opening forming a pocket proportioned to receive and hold a knot tied in the projected end portion of the fishline which is too large to be pulled through the passageway, the improvement wherein: said side opening pocket is longitudinally slotted with the slot width being less than the knot size to produce a tight fit and with the slot length being greater than the slot width and such that the sidewall portions of the connector at each side of the slot will flex apart without being over stressed whenever a line knot is pulled into the slot, and wherein a raised boss is formed about the slotted side opening to intercept a knot being pulled into the pocket to initiate flexing of the adjacent side portions of the connector responsive to pressure of a knot being pulled into the pocket, whereby to initiate flexing of the side portions of the connector responsive to pressure of the knot and to absorb and yield to stress concentrations caused by the knot which would otherwise tend to dent or cut the connector.

5. The connector defined in claim 4, wherein the exterior side portions of the boss are tangentially faired into the sides of the connector.

6. In a rod-like connector having one end affixed to the shank of a fishhook, a passageway through the other end sized to receive an end of a fishline threaded thereinto and a side opening in the connector connecting with the passageway through which the end portion of the line will project when threaded into the passageway, with the side opening forming a pocket proportioned to receive and hold a knot tied in the projected end portion of the fishline which is too large to be pulled through the passageway, the improvement wherein: said side opening pocket is longitudinally slotted with the slot width being less than the knot size to produce a tight fit and with the slot length being greater than the slot width and such that the sidewall portions of the connector at each side of the slot will flex apart without being over stressed whenever a line knot is pulled into the slot, and wherein the entrance of said passageway is deeply funnelled to facilitate threading a line thereinto and to reduce the mass of the connector to increase the resilience of the connector portion about the passageway.

* * * * *